United States Patent
Zheng et al.

(10) Patent No.: US 11,545,283 B2
(45) Date of Patent: Jan. 3, 2023

(54) ANISOTROPIC CONDUCTIVE FILM (ACF) STRUCTURE AND HOT-PRESSING METHOD AND HOT-PRESSING ASSEMBLY THEREOF

(71) Applicant: Jiangsu Telilan Coating Technology Co., Ltd., Wuxi (CN)

(72) Inventors: Liang Zheng, Wuxi (CN); Zheng Xu, Wuxi (CN); Shuibing Yan, Wuxi (CN)

(73) Assignee: Jiangsu Telilan Coaling Technology Co., Ltd., Wuxi (CN)

( * ) Notice: Subject to any disclaimer, the term of this patent is extended or adjusted under 35 U.S.C. 154(b) by 0 days.

(21) Appl. No.: 17/543,798

(22) Filed: Dec. 7, 2021

(65) Prior Publication Data
US 2022/0215989 A1 Jul. 7, 2022

(30) Foreign Application Priority Data
Jan. 5, 2021 (CN) .......................... 202110006898.3

(51) Int. Cl.
*H01B 13/06* (2006.01)
*B32B 5/14* (2006.01)
(Continued)

(52) U.S. Cl.
CPC .............. *H01B 13/06* (2013.01); *B32B 5/145* (2013.01); *B32B 15/08* (2013.01); *B32B 15/20* (2013.01);
(Continued)

(58) Field of Classification Search
CPC ........... B32B 5/14; B32B 15/08; B32B 15/20; B32B 27/20; B32B 37/0046; B32B 37/06;
(Continued)

(56) References Cited

U.S. PATENT DOCUMENTS

| 2003/0127725 A1* | 7/2003 | Sugaya | ..................... H05K 3/20 |
| | | | 257/E21.511 |
| 2008/0047663 A1 | 2/2008 | Nam et al. | |
| 2010/0294547 A1* | 11/2010 | Hatanaka | ............. H01R 12/714 |
| | | | 29/877 |

FOREIGN PATENT DOCUMENTS

CN 101322233 A 12/2008
CN 205488059 U 8/2016
(Continued)

OTHER PUBLICATIONS

Park "Effects of Polymer Ball Size and Polyvinylidene Fluoride Nanofiber on the Ball Capture Rate for 100-μm-Pitch Flex-on-Flex Assembly Using Anisotropic Conductive Films and Ultrasonic Bonding Method." IEEE Transactions on Components, Packaging and Manufacturing Technology, vol. 6, No. 7, Jul. 2016 (Year: 2016).*

*Primary Examiner* — Tri V Nguyen
(74) *Attorney, Agent, or Firm* — Bayramoglu Law Offices LLC

(57) ABSTRACT

An anisotropic conductive film (ACF) structure and a hot-pressing method and a hot-pressing assembly thereof are provided. The ACF structure includes an ACF and a copper/gold foil surface layer as a substrate. The ACF structure is hot-pressed by a hot-pressing method, which includes the following steps: allowing, when the ACF is in a molten state, the copper/gold foil surface layer and a bonded part to be conductive respectively to generate a magnetic field around to enhance the attraction of the copper/gold foil surface layer and the bonded part to conductive particles inside the ACF; and applying, when the ACF is in a curing stage, a closed circuit to ends of the copper/gold foil surface layer and the bonded part to perform real-time detection on the ACF to ensure the effectiveness of the hot pressing.

7 Claims, 3 Drawing Sheets

(51) Int. Cl.
*B32B 15/08* (2006.01)
*B32B 15/20* (2006.01)
*B32B 27/20* (2006.01)
*B32B 37/00* (2006.01)
*B32B 37/06* (2006.01)
*B32B 37/10* (2006.01)
*H01B 1/02* (2006.01)
*H01B 1/22* (2006.01)
*H01B 5/14* (2006.01)

(52) U.S. Cl.
CPC .......... *B32B 27/20* (2013.01); *B32B 37/0046* (2013.01); *B32B 37/06* (2013.01); *B32B 37/1045* (2013.01); *H01B 1/02* (2013.01); *H01B 1/22* (2013.01); *H01B 5/14* (2013.01); *B32B 2264/503* (2020.08); *B32B 2307/202* (2013.01)

(58) Field of Classification Search
CPC .......... B32B 37/1045; B32B 2264/503; B32B 2307/202; H01B 1/02; H01B 1/22; H01B 5/14; H01B 13/06
USPC .......................................................... 174/98
See application file for complete search history.

(56) References Cited

FOREIGN PATENT DOCUMENTS

| | | | | |
|---|---|---|---|---|
| CN | 106770479 A | 5/2017 | | |
| CN | 108459441 A | 8/2018 | | |
| JP | 2011249549 A | * 12/2011 | ............... | H05K 1/14 |

* cited by examiner

ANISOTROPIC CONDUCTIVE FILM (ACF) STRUCTURE AND HOT-PRESSING METHOD AND HOT-PRESSING ASSEMBLY THEREOF

CROSS REFERENCE TO THE RELATED APPLICATIONS

This application is based upon and claims priority to Chinese Patent Application No. 202110006898.3, filed on Jan. 5, 2021, the entire contents of which are incorporated herein by reference.

TECHNICAL FIELD

The present disclosure relates to the technical field of digital products, and in particular to an anisotropic conductive film (ACF) structure and a hot-pressing method and hot-pressing assembly thereof.

BACKGROUND

Contact electrical conduction is widely used in metal parts of digital products to achieve electromagnetic shielding and other purposes. In the prior art, the electroplating method and the conductive tape bonding method are typically used to form a contact conduction area on the surface of the metal part. The advantages and disadvantages of the two methods are as follows. (1) The electroplating method has the advantages of high electrical conductivity, low contact resistance, stability and reliability, but it is not environmentally friendly, has a complicated process and a high cost. (2) The conductive tape bonding method is environmentally friendly, has a simple process and a low cost, but it has the disadvantages of low electrical conductivity, poor thermal conductivity and poor stability.

The anisotropic conductive film (ACF) is composed of high-quality resin and conductive particles. The ACF is mainly used in a process where high-temperature lead-tin soldering cannot be performed on circuit boards, that is, the common bonding process. The common bonding process involves the connection of a flexible circuit board or flexible cable to a liquid crystal display (LCD), a printed circuit board (PCB) or a membrane switch, or the connection between flexible circuit boards.

Generally, the ACF is subject to a special hot pressing and curing process, to be melted, bonded and cured under the three necessary conditions of temperature, time and pressure, such that the ACF can effectively adhere to the surface of a metal structural part made of ordinary steel, stainless steel, aluminum, aluminum alloy and copper, etc., and to ensure excellent electrical performance and reliability. The conductive particles in the ACF achieve electrical conduction between an electronic component and a substrate.

The conductive particles of the ACF are mainly plated plastic balls, and a metal layer plated on the outside of the plastic balls plays a leading role in the electrical conduction. In order to achieve effective electrical conduction, the conductive particles are required to be blasted by force. The conductive particles are scattered inside the ACF, and the positions thereof are uncertain when the ACF is subject to hot-pressing. Therefore, it cannot be guaranteed that the conductive particles realize effective electrical conduction between the electronic component and the substrate after hot pressing, which affects the electrical conductivity of the ACF to some extent. In addition, the ACF is typically used for partial electrical conduction by making the upper and lower surfaces of the ACF adhere to the surface of the metal structural part, but such a connection process is complicated, and it is more likely to affect the effective electrical conduction.

SUMMARY

An objective of the present disclosure is to provide an anisotropic conductive film (ACF) structure and a hot-pressing method and hot-pressing assembly thereof. The present disclosure realizes local high-performance contact conduction on a metal structure. The present disclosure solves the problem of poor conductivity caused by double-sided adhesion and uncertain positions of scattered conductive particles during the hot pressing of an ordinary ACF. In addition, the present disclosure regulates the positions of the conductive particles to improve the electrical conductivity of the ACF to an electronic component and a substrate.

To achieve the above objective, the present disclosure adopts the following technical solutions:

The present disclosure provides an ACF structure. The ACF structure includes an ACF and a copper/gold foil surface layer as a substrate, where the ACF is coated on the copper/gold foil surface layer, and the ACF adheres to a workpiece to be conducted; the copper/gold foil surface layer is in contact with another workpiece to be conducted. Contact conduction can be formed on the side of the copper/gold foil surface layer to improve conduction performance.

For bonding in the electronics industry, the ACF structure combines the ACF with the copper/gold foil surface layer to realize the bonding of the ACF on the surface of ordinary steel, stainless steel, aluminum, aluminum alloy, copper, and other metal structures. The ACF structure can replace the traditional electroplating and conductive tape technologies to form a contact conduction solution with high conductivity, low contact resistance, low cost, stable performance, simple process and environmentally friendliness. The ACF structure meets the requirements of local high-performance contact conduction on metal structural parts, and can be widely used in metal structural parts of digital communication products and flat panel display (FPD), and other low-resistance and high-conductivity environments.

The ACF structure is hot-pressed by a hot-pressing method, which includes the following steps:

S1: vibrating the entire ACF in a molten state to accelerate the flow of conductive particles inside the ACF;

S2: allowing the copper/gold foil surface layer and a bonded part to be conductive respectively to generate a magnetic field around to enhance the attraction of the copper/gold foil surface layer and the bonded part to the conductive particles inside the ACF, such that the conductive particles are enriched toward the copper/gold foil surface layer and the joint part of the bonded part, and the conductive particles between the copper/gold foil surface layer and the bonded part increase the conductivity between the copper/gold foil surface layer and the bonded part; and S3: applying, when the ACF is in a curing stage, a closed circuit to ends of the copper/gold foil surface layer and the bonded part to perform real-time detection on the ACF so as to ensure the effectiveness of the hot pressing.

In the ACF hot-pressing method, when the ACF is in a molten state, the positions of the conductive particles inside the ACF are controlled to improve the conductivity of the conductive particles inside the ACF. When the ACF is in a curing stage, the conductivity of the ACF is detected in real time to ensure that the ACF forms effective conduction after hot pressing. The method solves the problem of unstable conduction of the ACF after hot pressing in the prior art.

The present disclosure proposes an ACF hot-pressing assembly based on the ACF hot-pressing method. The ACF hot-pressing assembly includes a pressure piece and a pressure-bearing plate, where the pressure-bearing plate is located under the pressure piece; a lower part of the pressure piece is provided with an electric heating tube, and an upper part of the pressure piece is provided with an evaporation tank and a condenser tube; two ends of the condenser tube are connected to the evaporation tank; a one-way valve is provided in the condenser tube; and a fan for cooling is provided outside the condenser tube.

The pressure piece is used to hot-press the ACF; the electric heating tube is energized to generate heat and provide a temperature required for the hot-pressing and curing of the ACF; and the evaporation tank is filled with water. When the electric heating tube heats up, the water inside the evaporation tank absorbs heat and boils. The kinetic energy of the boiling water is transferred to the ACF through the pressure piece, which makes the conductive particles inside the ACF vibrate. This increases the flow rate of the conductive particles and facilitates the enrichment of the conductive particles.

The fan is used to condense steam inside the evaporation tank by the condenser tube to prevent excessive pressure in the evaporation tank.

Further, the pressure-bearing plate may be used to carry the workpiece to be hot-pressed; and the pressure-bearing plate may be provided with a conductive assembly, which may be used to conduct electricity to the workpiece.

Specifically, the conductive assembly includes a power supply, a resistor, a first negative wire, a second negative wire, a first positive wire and a second positive wire; one end of each of the first negative wire and the second negative wire is connected to a negative electrode of the power supply, and the other end of each of the first negative wire and the second negative wire is provided with an adhesive plate; one end of each of the first positive wire and the second positive wire is connected to a positive electrode of the power supply, and the other end of each of the first positive wire and the second positive wire is provided with an adhesive plate; individual switches are respectively provided on the first negative wire, the second negative wire, the first positive wire and the second positive wire; and a bulb and a main switch are arranged on a main circuit of the power supply.

The conductive assembly works as follows:

When the ACF is in a molten state, the individual switches on the first negative wire, the second negative wire, the first positive wire and the second positive wire and the main switch are closed. The adhesive plates corresponding to the first negative wire and the first positive wire respectively adhere to ends of the copper/gold foil surface layer, such that the copper/gold foil surface layer is in a conducting state. The adhesive plates corresponding to the second negative wire and the second positive wire respectively adhere to ends of the workpiece, such that a joint part of the workpiece is in a conducting state. At this time, the copper/gold foil surface layer and the workpiece each are in a conducting state, and a magnetic field near the copper/gold foil surface layer and the workpiece attracts the conductive particles inside the ACF. The conductive particles are enriched toward the copper/gold foil surface layer and a joint part of the workpiece, and the conductive particles between the copper/gold foil surface layer and the workpiece increase the conductivity between the copper/gold foil surface layer and the workpiece.

When the ACF is in a cured state, the individual switches on the first negative wire and the second positive wire and the main switch are closed, and the individual switches on the second negative wire and the first positive wire are not closed. The adhesive plate corresponding to the first negative wire adheres to one end of the copper/gold foil surface layer, and the adhesive plate corresponding to the second positive wire adheres to one end of the workpiece. The joint part of the upper workpiece, the ACF and the copper/gold foil surface layer are in a connected state. At this time, the conductivity of the ACF is detected in real time through the conductive assembly. When the bulb lights up, the joint part of the workpiece, the ACF and the copper/gold foil surface layer are in an effectively conducting state.

The present disclosure has the following beneficial effects.

1. In the present disclosure, the ACF structure includes an ACF and a copper/gold foil surface layer as a substrate. For bonding in the electronics industry, the ACF structure combines the ACF with the copper/gold foil surface layer and adopts special hot-pressing method and hot-pressing assembly to realize the bonding of the ACF on the surface of ordinary steel, stainless steel, aluminum, aluminum alloy, copper and other metal structures. The ACF structure can replace the traditional electroplating and conductive tape technologies to form a contact conduction solution with high conductivity, low contact resistance, low cost, stable performance, simple process and environmentally friendliness. The ACF structure meets the requirements of local high-performance contact conduction on metal structural parts, and can be widely used in metal structural parts of digital communication products and FPD, and other low-resistance and high-conductivity environments.

2. In the ACF hot-pressing method of the present disclosure, when the ACF is in a molten state, the positions of the conductive particles inside the ACF are controlled to improve the conductivity of the conductive particles inside the ACF. When the ACF is in a curing stage, the conductivity of the ACF is detected in real time to ensure that the ACF forms effective conduction after hot pressing. The method solves the problem of unstable conduction of the ACF after hot pressing in the prior art.

3. The present disclosure proposes an ACF hot-pressing assembly based on the ACF structure and its hot-pressing method. The ACF hot-pressing assembly uses the heat energy of hot-pressing to form a water seal as vibration energy, making full use of energy. The conductive assembly realizes the conduction of the ACF in the molten state and the cured state. The structure is simple and practical, and has strong applicability.

In summary, the present disclosure provides a contact conduction solution with high conductivity, low contact resistance, low cost, stable performance, simple process, environmentally friendliness and strong applicability.

Figure 1:
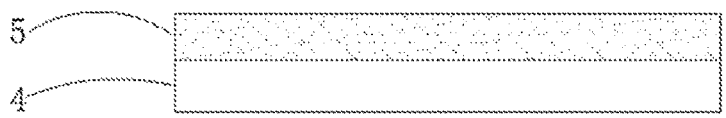
FIG. 1 is a view illustrating a structure of an anisotropic adhesive film (ACF) structure.

Reference Numerals: 1. pressure piece; 2. pressure cylinder; 3. pressure-bearing plate; 4. copper/gold foil surface layer; 5. anisotropic conductive film (ACF); 6. workpiece; 7. negative electrode of power supply; 8. positive electrode of power supply; 11. electric heating tube; 12. evaporation tank; 13. condenser tube; 14. fan; 15. one-way valve; 51. metal ball; 61. joint part; 71. first negative wire; 72. second negative wire; 71. first positive wire; and 72. second positive wire.

DETAILED DESCRIPTION OF THE EMBODIMENTS

The technical solutions of the embodiments of the present disclosure are clearly and completely described below with reference to the drawings. Apparently, the described embodiments are merely a part rather than all of the embodiments of the present disclosure.

Embodiment 1

The present disclosure provides an anisotropic conductive film (ACF) structure. The ACF structure includes an ACF 5 and a copper/gold foil surface layer 4 as a substrate. The ACF 5 is coated on the copper/gold foil surface layer 4, and the ACF 5 adheres to a workpiece to be conducted. The copper/gold foil surface layer 4 is in contact with another workpiece to be conducted. Contact conduction can be formed on the side of the copper/gold foil surface layer 4 to improve conduction performance.

For bonding in the electronics industry, the ACF structure combines the ACF with the copper/gold foil surface layer to realize the bonding of the ACF on the surface of ordinary steel, stainless steel, aluminum, aluminum alloy, copper, and other metal structures. The ACF structure can replace the traditional electroplating and conductive tape technologies to form a contact conduction solution with high conductivity, low contact resistance, low cost, stable performance, simple process and environmentally friendliness. The ACF structure meets the requirements of local high-performance contact conduction on metal structural parts, and can be widely used in metal structural parts of digital communication products and flat panel display (FPD), and other low-resistance and high-conductivity environments.

Embodiment 2

Figure 2:
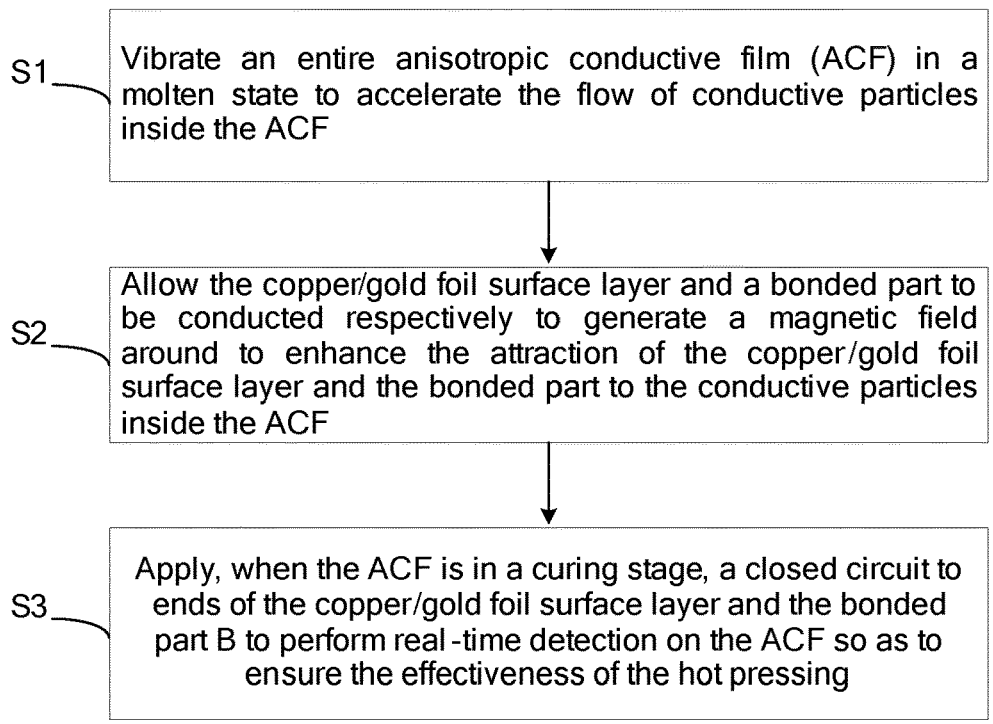
FIG. 2 is a flowchart of an ACF hot-pressing method.

Referring to FIG. 2, the ACF structure in Embodiment 1 is hot-pressed by a hot-pressing method, which includes the following steps:

S1: Vibrate the entire ACF in a molten state to accelerate the flow of conductive particles inside the ACF.

S2: Allow the copper/gold foil surface layer and a bonded part to be conductive respectively to generate a magnetic field around to enhance the attraction of the copper/gold foil surface layer and the bonded part to the conductive particles inside the ACF, such that the conductive particles are enriched toward the copper/gold foil surface layer and the joint part of the bonded part, and the conductive particles between the copper/gold foil surface layer and the bonded part increase the conductivity between the copper/gold foil surface layer and the bonded part.

S3: Apply, when the ACF is in a curing stage, a closed circuit to ends of the copper/gold foil surface layer and the bonded part to perform real-time detection on the ACF so as to ensure the effectiveness of the hot pressing.

In the ACF hot-pressing method, when the ACF is in a molten state, the positions of the conductive particles inside the ACF are controlled to improve the conductivity of the conductive particles inside the ACF. When the ACF is in a curing stage, the conductivity of the ACF is detected in real time to ensure that the ACF forms effective conduction after hot pressing. The method solves the problem of unstable conduction of the ACF after hot pressing in the prior art.

Embodiment 3

Figure 3:
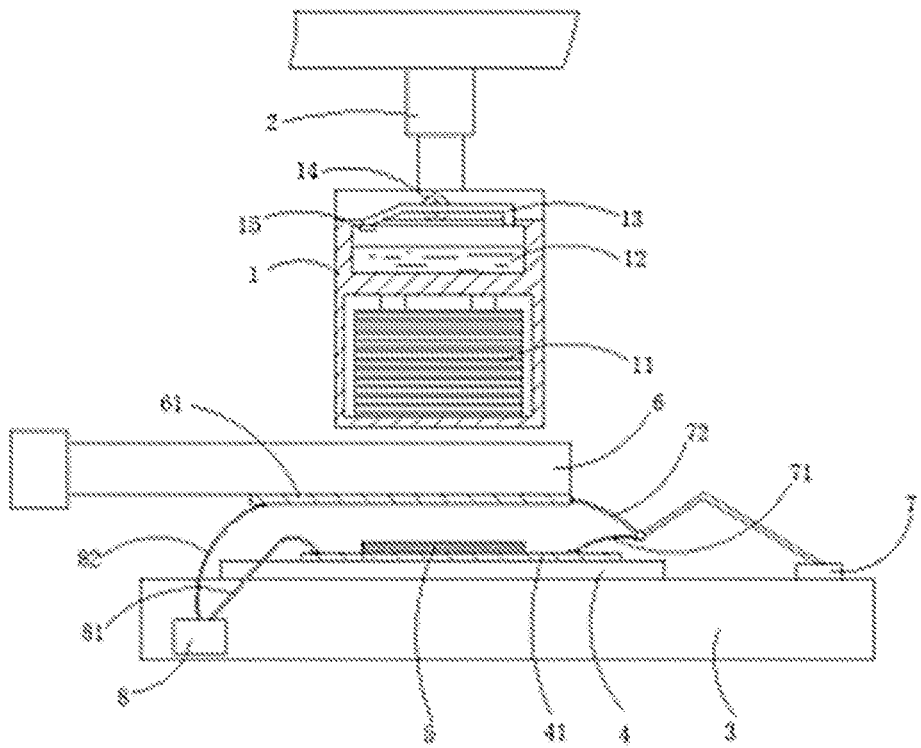
FIG. 3 is a view illustrating a structure of an ACF hot-pressing assembly.

This embodiment proposes an ACF hot-pressing assembly based on the ACF hot-pressing method in Embodiment 2. Referring to FIG. 3, the ACF hot-pressing assembly includes a pressure piece 1 and a pressure-bearing plate 3. The pressure-bearing plate 3 is located under the pressure piece 1. A lower part of the pressure piece 1 is provided with an electric heating tube 11, and an upper part of the pressure piece 1 is provided with an evaporation tank 12 and a condenser tube 13. Two ends of the condenser tube 13 are connected to the evaporation tank 12. A one-way valve 15 is provided in the condenser tube 13, and a fan 14 for cooling is provided outside the condenser tube 13.

In this embodiment, the pressure piece 1 is used to hot-press the ACF 5; the electric heating tube 11 is energized to generate heat and provide the temperature required for the hot-pressing and curing of the ACF 5; and the evaporation tank 12 is filled with water. When the electric heating tube 11 heats up, the water inside the evaporation tank 12 absorbs heat and boils. The kinetic energy of the boiling water is transferred to the ACF 5 through the pressure piece 1, which makes the conductive particles 51 inside the ACF 5 vibrate. This increases the flow rate of the conductive particles 51 and facilitates the enrichment of the conductive particles 51.

In this embodiment, the fan 14 is used to condense steam inside the evaporation tank 12 by the condenser tube 13 to prevent excessive pressure in the evaporation tank 12.

Further, the pressure-bearing plate 3 is used to carry the workpiece to be hot-pressed; and the pressure-bearing plate 3 is provided with a conductive assembly, which is used to conduct electricity to the workpiece.

Figure 6:
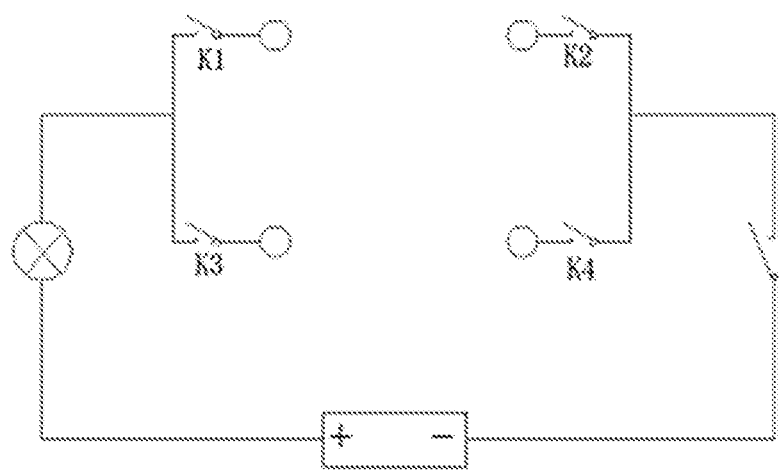
FIG. 6 is a view illustrating circuit connection of a conductive assembly of the ACF hot-pressing assembly.

Specifically, referring to FIG. 6, the conductive assembly includes a power supply, a resistor, a first negative wire 71, a second negative wire 72, a first positive wire 81 and a second positive wire 82. One end of each of the first negative wire 71 and the second negative wire 72 is connected to a negative electrode 7 of the power supply, and the other end of each of the first negative wire 71 and the second negative wire 72 is provided with an adhesive plate. One end of each of the first positive wire 81 and the second positive wire 82 is connected to a positive electrode 8 of the power supply, and the other end of each of the first positive wire 81 and the second positive wire 82 is provided with an adhesive plate. These adhesive plates are used to bond joint parts of the workpieces, such that the first negative wire 71, the second negative wire 72, the first positive wire 81 and the second positive wire 82 are connected to the joint parts of the workpieces.

Further, individual switches are arranged on the first negative wire 71, the second negative wire 72, the first positive wire 81 and the second positive wire 82. In this embodiment, the first negative wire 71 is provided with a switch K4, the second negative wire 72 is provided with a switch K2, the first positive wire 81 is provided with a switch K1, and the second positive wire 82 is provided with a switch K3. A bulb and a main switch are arranged on a main circuit of the power supply, and the bulb can be used as a resistor to prevent the circuit from short-circuiting.

In this embodiment, the conductive assembly has two working states:

(1) In a first working state: When the ACF 5 is in a molten state, referring to FIG. 6, the individual switches on the first negative wire 71, the second negative wire 72, the first positive wire 81 and the second positive wire 82 and the main switch are closed. The adhesive plates corresponding to the first negative wire 71 and the first positive wire 81 respectively adhere to ends of the copper/gold foil surface layer 4, such that a lower workpiece is in a conducting state. The adhesive plates corresponding to the second negative wire 72 and the second positive wire 82 respectively adhere to ends of the workpieces, such that the joint part of an upper workpiece is in a conducting state. At this time, the ends of the copper/gold foil surface layer 4 and the workpiece 6 are in a conducting state, and a magnetic field near the ends of the copper/gold foil surface layer 4 and the workpiece 6 attracts the conductive particles 51 inside the ACF 5. The conductive particles 51 are enriched toward the ends of the copper/gold foil surface layer 4 and the joint part of the workpiece 6, and the conductive particles 51 between the ends of the copper/gold foil surface layer 4 and the joint part of the workpiece 6 increase the conductivity between the ends of the copper/gold foil surface layer 4 and the workpiece 6.

(2) In a second working state: When the ACF 5 is in a cured state, referring to FIG. 7, the individual switches on the first negative wire 71 and the second positive wire 82 and the main switch are closed, and the individual switches on the second negative wire 72 and the first positive wire 81 are not closed. The adhesive plate corresponding to the first negative wire 71 adheres to one end of the copper/gold foil surface layer 4, and the adhesive plate corresponding to the second positive wire 82 adheres to one end of the workpiece 6. The joint part 61 of the workpiece 6, the ACF 5 and the copper/gold foil surface layer 4 are in a connected state. At this time, the conductivity of the ACF 5 is detected in real time through the conductive assembly. When the bulb lights up, the joint part 61 of the workpiece 6, the ACF 5 and the copper/gold foil surface layer 4 are in an effectively conducting state.

In this embodiment, the ACF hot-pressing assembly works as follows:

Step 1: The ACF structure is placed on the pressure-bearing plate 3. The copper/gold foil surface layer 4 is placed under the ACF 5, and the workpiece 6 is fixed above the ACF 5, such that the position of the upper joint part 61 of the workpiece 6 corresponds to the position of the ACF 5.

Figure 7:
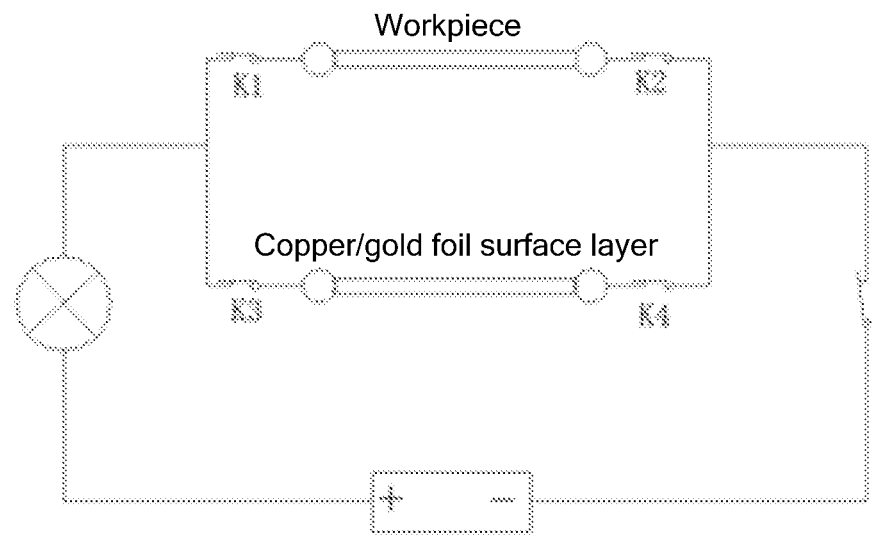
FIG. 7 is a view illustrating circuit connection of the conductive assembly of the ACF hot-pressing assembly in a first working state.

The conductive assembly is ready, and the conductive assembly is in the first working state. Referring to FIG. 7, the adhesive plate corresponding to the first negative wire 71 adheres to one end of the copper/gold foil surface layer 4, and the adhesive plate corresponding to the first positive wire 81 adheres to the other end of the copper/gold foil surface layer 4, such that the copper/gold foil surface layer 4 is in a conducting state. The adhesive plate corresponding to the second negative wire 72 adheres to one end of the joint part 61 of the workpiece 6, and the adhesive plate corresponding to the second positive wire 82 adheres to the other end of the joint part 61 of the workpiece 6, such that the joint part 61 of the workpiece 6 is in a conducting state. The switches K1, K2, K3, K4 and the main switch are closed. Since the conductive particles inside the ACF 5 are not squeezed, the copper/gold foil surface 4 and the joint part 61 of the workpiece 6 are in an independent conducting state, and a magnetic field is formed at the copper/gold foil surface 4 and the joint part 61 of the workpiece 6.

Figure 4:
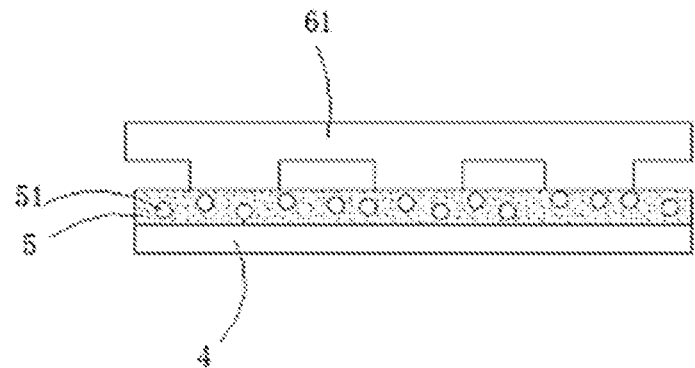
FIG. 4 is a view illustrating normal distribution of conductive particles in an ACF.
Figure 5:
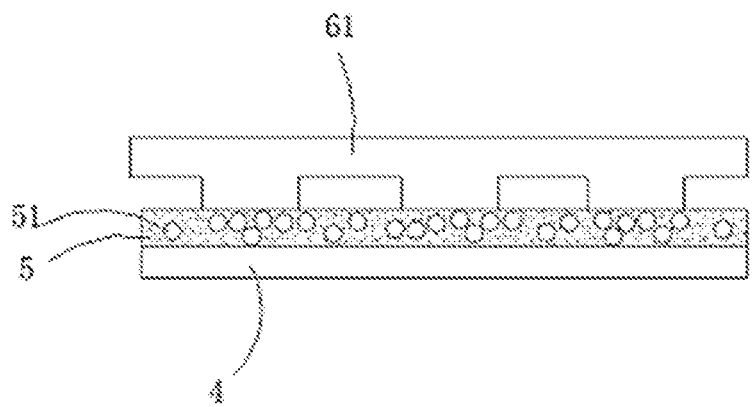
FIG. 5 is a view illustrating enrichment of the conductive particles in the ACF.

Step 2: The electric heating tube 11 in the pressure piece 1 is energized to generate heat. The pressure cylinder 2 on the upper part of the pressure piece 1 is activated, and the pressure cylinder 2 pushes the pressure piece 1 to the workpiece 6. Referring to FIG. 4, the conductive particles 51 inside the ACF are uniformly distributed. When the pressure piece 1 contacts the workpiece 6, the heat is transferred to the ACF 5, and the ACF 5 is in a molten state. Referring to FIG. 5, the copper/gold foil surface layer 4 and the joint part 61 of the workpiece 6 attract the conductive particles 51 inside the ACF 5, such that the conductive particles 51 are enriched toward the copper/gold foil surface layer 4 and the joint part 61 of the workpiece 6. Meanwhile, the water inside the evaporation tank 12 absorbs heat and boils. The kinetic energy of the boiling water is transferred to the ACF through the pressure piece 1, which makes the conductive particles 51 inside the ACF vibrate. This increases the flow rate of the conductive particles 51 and facilitates the enrichment of the conductive particles 51.

Step 3: As the temperature of the ACF 5 increases, the ACF 5 enters a cured state. The pressure piece 1 presses the ACF 5 to complete the effective adhesion and conduction between the ACF structure and the joint part 61 of the workpiece 6.

Figure 8:
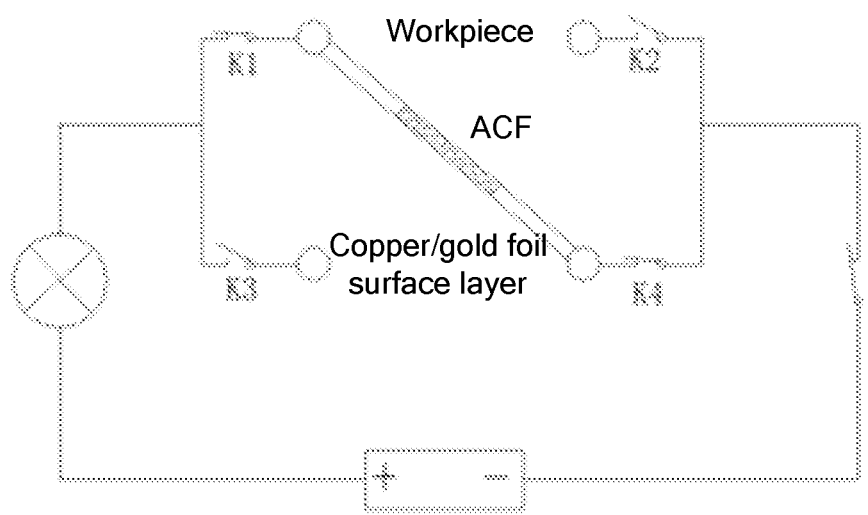
FIG. 8 is a view illustrating circuit connection of the conductive assembly of the ACF hot-pressing assembly in a second working state.

In this process, referring to FIG. 8, on the basis of the first working state of the conductive assembly, the adhesion between the first positive wire 81 and the copper/gold foil surface layer 4 is released, and the adhesion between the second negative wire 72 and the joint part 61 of the workpiece 6 is released. The switches K2 and K3 are disconnected. The copper/gold foil surface layer 4, the ACF 5 and the joint part 61 of the workpiece 6 are in a connected state. The conductive assembly performs real-time detection on the conduction of the ACF. When the pressure piece 1 squeezes the conductive particles 51 inside the ACF 5, the bulb lights up, indicating that the copper/gold foil surface layer 4, the ACF 5 and the joint part 61 of the workpiece 6 are in a connected state.

The ACF hot-pressing assembly in this embodiment can realize the ACF hot-pressing method in Embodiment 1, and realize the stable conduction of the ACF structure. This embodiment provides a solution with application value to the problem of unstable conduction of the ACF after hot pressing in the prior art.

The above described are merely preferred specific implementations of the present disclosure, and the protection scope of the present disclosure is not limited thereto. Any equivalent substitutions or changes made by those skilled in the art according to the technical solutions and concepts of the present disclosure within the technical scope of the present disclosure should be covered by the protection scope of the present disclosure.

What is claimed is:

1. An anisotropic conductive film (ACF) structure consisting of of an ACF, conductive particles in the ACF, and a copper/gold foil surface layer as a substrate, wherein the ACF is coated on the copper/gold foil surface layer;
the ACF structure is hot-pressed by a hot-pressing method, the hot-pressing method comprises the following steps:
S1: vibrating the ACF in a molten state to accelerate a flow of the conductive particles inside the ACF;
S2: exposing the copper/gold foil surface layer and a bonded part a magnetic field to enhance an attraction of the copper/gold foil surface layer and the bonded part to the conductive particles inside the ACF; and
S3: applying, when the ACF is in a curing stage, a closed circuit to ends of the copper/gold foil surface layer and the bonded part to perform real-time detection on the ACF so as to ensure effectiveness of the hot pressing method;
the hot-pressing method of the ACF structure is implemented by using a hot-pressing assembly; the hot-pressing assembly comprises a pressure piece and a pressure-bearing plate; and the pressure-bearing plate is located under the pressure piece;
a lower part of the pressure piece is provided with an electric heating tube, and an upper part of the pressure piece is provided with an evaporation tank and a condenser tube; two ends of the condenser tube are connected to the evaporation tank; a one-way valve is provided in the condenser tube; and a fan for cooling is provided outside the condenser tube;
the pressure-bearing plate is provided with a conductive assembly; the conductive assembly comprises a power supply, a resistor, a first negative wire, a second negative wire, a first positive wire and a second positive wire; a first end of each of the first negative wire and the second negative wire is connected to a negative electrode of the power supply, and a second end of each of the first negative wire and the second negative wire is provided with an adhesive plate; a first end of each of the first positive wire and the second positive wire is connected to a positive electrode of the power supply, and a second end of each of the first positive wire and the second positive wire is provided with an adhesive plate; individual switches are respectively provided on the first negative wire, the second negative wire, the first positive wire and the second positive wire; and a bulb and a main switch are arranged on a main circuit of the power supply.

2. The ACF structure according to claim 1, wherein the ACF is in a molten state, the individual switches on the first negative wire, the second negative wire, the first positive wire and the second positive wire and the main switch are closed; the adhesive plates corresponding to the first negative wire and the first positive wire respectively adhere to ends of the copper/gold foil surface layer, such that the copper/gold foil surface layer is in a conducting state; and the adhesive plates corresponding to the second negative wire and the second positive wire respectively adhere to ends of a workpiece, such that a joint part of the workpiece is in a conducting state.

3. The ACF structure according to claim 1, wherein when the ACF is in a cured state, the individual switches on the first negative wire and the second positive wire and the main switch are closed, and the individual switches on the second negative wire and the first positive wire are not closed; and the adhesive plate corresponding to the first negative wire adheres to one end of the copper/gold foil surface layer, and the adhesive plate corresponding to the second positive wire adheres to one end of the workpiece, such that the copper/gold foil surface layer, the ACF and a joint part of the workpiece are in a conducting state.

4. The ACF structure according to claim 1, wherein the conductive particles are metal plated plastic balls.

5. A method of making the ACF structure according to claim 1, wherein the ACF structure is hot-pressed by a hot-pressing method, the hot-pressing method comprises the following steps:
S1: vibrating the ACF in the molten state to accelerate the flow of the conductive particles inside the ACF;
S2: exposing the copper/gold foil surface layer and the bonded part of the joint part to the magnetic field to attract conductive particles in the ACF to position between the copper/gold foil surface layer and the bonded part of the joint part, wherein the bonded part of the joint part is adjacent to the ACF; and
S3: applying, when the ACF is in the curing stage, the closed circuit to ends of the copper/gold foil surface layer and the bonded part to perform real-time detection on the ACF to ensure effectiveness of the hot pressing method.

6. The method of making the ACF structure according to claim 5, wherein when the ACF is in a molten state, the individual switches on the first negative wire, the second negative wire, the first positive wire and the second positive wire and the main switch are closed; the adhesive plates corresponding to the first negative wire and the first positive wire respectively adhere to ends of the copper/gold foil surface layer, such that the copper/gold foil surface layer is in a conducting state; and the adhesive plates corresponding to the second negative wire and the second positive wire respectively adhere to ends of a workpiece, such that a joint part of the workpiece is in a conducting state.

7. The method of making the ACF structure according to claim 5, wherein when the ACF is in a cured state, the individual switches on the first negative wire and the second positive wire and the main switch are closed, and the individual switches on the second negative wire and the first positive wire are not closed; and the adhesive plate corresponding to the first negative wire adheres to one end of the copper/gold foil surface layer, and the adhesive plate corresponding to the second positive wire adheres to one end of the workpiece, such that the copper/gold foil surface layer, the ACF and a joint part of the workpiece are in a conducting state.

* * * * *